United States Patent [19]

O'Leary et al.

[11] 4,442,009

[45] Apr. 10, 1984

[54] BOILER WATER TREATMENT

[75] Inventors: Richard P. O'Leary, Wayne; David W. Reichgott, Richboro, both of Pa.

[73] Assignee: Betz Entec, Inc., Horsham, Pa.

[21] Appl. No.: 385,751

[22] Filed: Jun. 7, 1982

[51] Int. Cl.$^3$ .............................................. C02F 5/10
[52] U.S. Cl. .................................... 210/697; 210/698; 210/701; 252/181
[58] Field of Search ............... 210/697, 698, 701, 702; 252/180, 181

[56] References Cited

U.S. PATENT DOCUMENTS

| | | | |
|---|---|---|---|
| 3,085,916 | 4/1963 | Zimmie et al. | 210/698 |
| 3,463,730 | 8/1969 | Booth et al. | 252/180 |
| 3,520,813 | 7/1970 | Hansen et al. | 252/181 |
| 3,630,937 | 12/1971 | Baum et al. | 252/181 |

*Primary Examiner*—Peter A. Hruskoci
*Attorney, Agent, or Firm*—Alexander D. Ricci; Bruce E. Peacock

[57] ABSTRACT

The present invention is directed to a method for controlling scale which would otherwise be formed from water-soluble calcium, magnesium and iron impurities contained in boiler water which would provide calcium, magnesium and iron ions. The method comprises adding to said water: (i) a chelant selected from the group of ethylene diamine tetraacetic acid and the water soluble salts thereof, in an amount which is sub-stoichiometric to that amount required to react with said ions present in the water; (ii) a water soluble phosphate salt which will provide phosphate ions in said water in an amount which is less than a 1:1 mole ratio of phosphate to calcium, but which is sufficient to react with all the calcium ions provided by said impurities which are not complexed by the chelant; and (iii) a water soluble polymethacrylic acid or water soluble salt thereof in an amount sufficient to disperse any particles formed by the reaction of the calcium ions with the phosphate ions and any other particulate matter formed by the reactions of the magnesium and iron ions.

9 Claims, No Drawings

BOILER WATER TREATMENT

BACKGROUND OF THE INVENTION

Deposition is a major problem in the operation of steam generating equipment. Deposition is the accumulation of material on boiler surfaces that can cause overheating and loss of efficiency due to lost heat transfer, as well as circulation restrictions. Such conditions frequently result in unscheduled outages.

Pretreatment of boiler feedwater has undergone significant advances and it is now possible to provide boilers with water closely approaching the ultra-pure level. This degree of purification, however, requires elaborate pretreatment systems. Capital expenditures required to obtain such pretreatment equipment trains can be considerable, and often are not justifiable when balanced against the capability of internal treatment. In addition, conscientious operation and maintenance are also required. The quality of feedwater required is decided by boiler operating pressure, design and heat transfer rates.

The need to provide boilers with high quality feedwater is a natural result of the advances made in boiler performance. The heating surface to evaporation ratio has decreased and is continuing to decrease, resulting in a high heat transfer rate on radiant water wall tubes, often in excess of 200,000 Btu's per square foot per hour and a correspondingly low tolerance for deposition.

Except for supercritical once-through boilers, the majority of boiler systems today can, and do, operate on relatively good quality feedwater, but not approaching the ultra-pure level. Most boiler systems have at least sodium zeolite softening; many have demineralizer trains. The resulting feedwater quality ranges from 0.01 to 2.0 parts per million (ppm) total hardness. But even water of this quality does not provide deposit-free operation. Therefore, good internal boiler water treatment programs are necessary.

DEPOSITS

Many solids, soluble in boiler feedwater, precipitate in the boiler water. This happens for one or both of two reasons: change in chemistry of water when going from feedwater to boiler water conditions, and retrograde solubility characteristics of some salts.

One of the more significant chemical changes in feedwater to boiler water is the conversion of bicarbonate to carbonate. This is an interaction that results in the formation of carbonate ion ($CO_3^=$) from the feedwater bicarbonate ion ($HCO_3^-$).

The end result is the production of carbonate which will combine with calcium to form calcium carbonate, a relatively insoluble salt. Magnesium hydroxide and iron oxide are also produced by changes in water chemistry.

Other feedwater-soluble salts become insoluble as the temperature is increased. Salts of this type are said to have retrograde solubility. Various silicates and aluminates are examples of this.

Calcium, magnesium, iron, copper, aluminum, silica and to a lesser extent silt and oil, are common contaminants in boiler feedwater that can form deposits. The resulting deposits usually fall into one of two types: scale that is crystallized directly on tube surfaces; and sludge deposits consisting of various salts that have precipitated elsewhere which consist of discrete and usually non-uniform particles.

Salts that are not totally insoluble in boiler water, but that lose solubility as the solution temperature increases, often precipitate directly on tube surfaces. These salts actually reach the deposit site in a soluble form. The precipitate formed in this manner will usually have a fairly homogeneous composition and crystal structure. Salts having a solubility decrease corresponding to a solution temperature increase are termed retrograde soluble. The precipitate form is often called scale.

Before the introduction of phosphate control years ago, widespread calcium carbonate scaling throughout a boiler was common. The purpose of phosphate control was to eliminate calcium carbonate scale formation in favor of a precipitate that could produce sludge.

Scale forms where it can be tolerated least—on high heat transfer surfaces. It is in this location that the conditions necessary to cause the precipitation of salts are found. At areas of high heat transfer and high evaporation rates there is a significant increase in the dissolved solids concentration. There is also a localized temperature rise.

A number of different scale-forming salts precipitate in these regions, the nature of which depends on the local chemical makeup of the concentrated water film. Normal constituents of this type deposit are calcium, magnesium, silica, aluminum, iron and in some cases sodium. The exact combinations in which they exist are different from boiler to boiler, and even location to location. The precipitation is, however, usually somewhat selective for any given boiler water chemistry. In one boiler, scale may form as calcium silicate; in another, as sodium iron silicate.

Compared to other precipitation reactions such as calcium phosphate, the crystallization of scale is a slow reaction. This promotes the formation of a fairly well defined crystal growth, especially considering the varying composition of the water environment.

Slow, in-place, crystal growth forms a hard, dense, glassy and highly insulating material that is deposited on tube metal. Some forms of scale are so tenacious that they resist any type of removal, mechanical or chemical.

The accumulation of solids that have precipitated in the bulk boiler water, or that entered the boiler as suspended solids, is a second type of deposit. In this case, these insoluble particles, rather than ions, are transported to the deposit site by water. The resulting deposit is termed sludge.

From a practical viewpoint, particulate deposits can be hard, dense and tenacious. Heat has a tendency to bake deposits in place, which is particularly prevalent in improper draining (fast) of a hot boiler. Once baked in place, sludge deposits can be as troublesome as scale.

With crystalline scale, the controlling factors in deposit formation are the creation of a locally supersaturated solution by over-concentration and a localized temperature rise. With particulate deposits, the controlling factors are the surface charge on a particle, and the water flow past the tube metal which should normally provide a good washing action.

After deposition has started, many particles become bound to one another. Intraparticle bonding need not occur between every particle in a deposit mass to physically bind the accumulation together. Some non-bound particles can be effectively captured in a network of bound particles. Binding is often a function of surface charge and loss of water of hydration. Iron oxide, which exists in many hydrated and oxide forms, is particularly prone to this bonding phenomenon. Some silicates will do the same.

CHEMICAL TREATMENT

Today there are two basic methods of applying internal boiler water treatment for the control of deposition: chelant/polymer and phosphate/polymer. One is a solubilizing program, the other is a precipitating program.

Carbonate Control. Before the acceptance of phosphate treatment in the 1930's, calcium sulfate scaling was the major recognized problem in the internal treatment of boiler water. Sodium carbonate was the standard precipitating agent used in internal treatment at the time. Calcium carbonate is less soluble than calcium sulfate and the objective was to precipitate calcium as calcium carbonate rather than as calcium sulfate.

The driving force in this reaction is the maintenance of a high concentration of carbonate ion in the boiler water. Even where this was accomplished, major scaling by calcium carbonate was common by today's standards.

However, as boiler pressures slowly rose to 200 psi and above, it became more difficult to maintain a high concentration of carbonate ion in the boiler water due to the decomposition of carbonate ion at higher boiler water temperatures.

Sodium carbonate decomposes in the boiler, forming sodium hydroxide and carbon dioxide. The carbon dioxide leaves the boiler with the steam, increasing the corrosivity of the steam condensate.

Phosphate Control. The phosphate ion does not decompose as does the carbonate ion at higher boiler water temperatures. This obvious advantage favors phosphate over carbonate, together with the fact that calcium phosphate is more insoluble than calcium carbonate.

Calcium phosphate is virtually insoluble in boiler water. Maintaining even small levels of phosphate will ensure the precipitation of calcium phosphate in midstream, away from heating surfaces. The introduction of phosphate treatment eliminated calcium carbonate scale.

When calcium phosphate is formed in boiler water of sufficient alkalinity (pH 11.0 to 12.0), a particle of relatively non-adherent surface charge is produced. This is not to say that over a period of time deposit accumulations do not develop, they do, but they can be reasonably well controlled with blowdown.

Phosphate/Polymer Control. Phosphate treatments respond well to dispersant supplements. Natural organics comprised the first supplement. Some types of natural organics were added to promote the formation of a limited floc particle that would be thrown out in the mud drum, and then were removed through bottom sludge blowoff. Starches and other high-molecular-weight natural organics were used for this.

There have been many advances in polymer development over the years. A number of synthetic and natural polymers are today used in phosphate precipitation programs. Some are extremely effective. Today's polymers are usually low-molecular-weight with numerous active sites. The principle is now dispersion rather than sludge building. Some polymers are specific for hardness salts, others for iron, others are good broad spectrum performers.

In a phosphate precipitation treatment program, the magnesium portion of the hardness contamination is precipitated preferentially as magnesium silicate. If silica is not present, the magnesium will come down as magnesium hydroxide. If insufficient boiler water alkalinity is being maintained, magnesium can combine with phosphate, forming magnesium phosphate, a particle with a surface charge that makes it very prone to adhere to tube surfaces and then collect other solids. Alkalinity is a major part of a phosphate precipitation program.

The magnesium silicate formed in a precipitating program is not a particularly adherent particle, but it contributes to deposit buildup on a par with other contaminants. The analyses of typical boiler deposits show that magnesium silicate is present in roughly the same ratio as calcium phosphate, and both deposit at a rate relative to their levels in boiler feedwater.

Polymers are effective in dispersing magnesium silicate and magnesium hydroxide as well as calcium phosphate. Although the mechanism is quite complex, it can be said that the surface area and the surface charge to mass ratio of typical boiler solids are significantly altered with polymers. With the proper selection of polymers, along with maintaining adequate polymer levels, the surface charge on the particle can be favorably altered. Polymers, used for a number of different applications in all phases of water treatment, are used for their dispersing action in boiler water treatment.

There is more than one mechanism thought to take place in the polymer dispersant system. In addition to changing the surface charge character, polymers also function by distortion of crystal growth.

Maintaining the proper level of polymer in a boiler can make the difference between the formation of a generally heavy deposit throughout the boiler, localized accumulations or an acceptably clean boiler.

Chelant Control. Chelants are the prime additives in a solubilizing boiler water treatment program. Chelants have the ability to complex and prevent the deposition of many cations (hardness and heavy metals) under boiler water conditions. They accomplish this by locking the metal into a soluble organic ring structure. When applied with a dispersant, chelants will result in clean waterside surfaces.

Chelants are weak organic acids, usually injected into boiler feedwater in the neutralized sodium salt form. Chelants are hydrolyzed in water and an organic anion is produced on hydrolysis. Full hydrolysis depends on a relatively high pH.

The anionic chelant has reactive sites that attract coordination sites on cations (hardness and heavy metal contaminants); coordination sites are areas on the ion that are receptive to chemical bonding. Iron, for example, has six coordination sites, as does EDTA. Iron ions entering the boiler as contamination from the condensate system, for example, combine with EDTA. Since all coordination sites on the iron ion are used by the EDTA, a stable metal chelate is formed.

NTA (nitrilo triacetic acid) is another chelant commonly applied to boiler feedwater. NTA has four coordination sites, and does not form as stable a complex as EDTA. With NTA, the unused sites on the cation are susceptible to reactions with competing anions.

Chelants combine with cations that form deposits, such as calcium, magnesium, iron and copper. The metal chelate formed is water-soluble. When the chelate is stable, precipitation does not occur. While there are many substances having chelating properties, EDTA and in some cases NTA are, to date, most suitable for boiler feedwater treatment.

The effectiveness of a chelant program is limited by the concentration of the competing anions. With the exception of phosphate, the competing anion limitations on an EDTA system have been shown by experience not to be severe. Alkalinity and silica, in addition to phosphate, are restricting considerations when applying NTA.

Chelant/Polymer Iron Control. Iron oxide is of particular concern in today's boiler water treatment programs. Deposition from the typically low level hardness in boiler feedwater (less than 1.0 ppm normally) is eliminated with chelant programs, and can be reduced up to 95 percent on a good polymer/phosphate treatment program. Not only is iron oxide becoming a significant contributor to deposits, corresponding to the overall reduction of hardness deposit potential, but the higher evaporation rates of new boilers create conditions suitable for iron oxide deposition to occur.

Chelants with high stability values, such as EDTA, can complex iron from some types of deposits; however, this is limited by competition with reactions leading to stable iron oxides. Current investigation shows that relying on EDTA or other chelants alone is not the most satisfactory method for iron control.

Under normal chelant control conditions maintaining the standard recommended residual for a given boiler system, a limited chelation of incoming iron occurs. This is usually enough to solubilize some condensate iron contamination. In normal use, therefore, EDTA can to a degree out-compete hydroxide in the iron hydroxide/iron/EDTA system.

High overfeed of chelant can remove large quantities of iron oxide, but this is undesirable. High excess chelant cannot distinguish between the iron oxide that forms the protective magnetite coating and iron oxide that forms deposits.

The best approach to control iron oxide is a chelant/polymer combination. Adequate chelant is fed to complex hardness and soluble iron, with a slight excess to solubilize iron contamination. Polymers are then added to condition and disperse additional iron oxide contamination.

The use of a chelant/polymer program can result in clean waterside surfaces, which in turn provide much more reliable boiler operation.

U.S. Pat. No. 3,520,813, which is hereby incorporated by reference, describes methods and compositions for use in the control of scale which combine the use of polymer/chelant systems with either phosphate, carbonate, and/or silicate controls.

According to the invention of this patent, an agent capable of reacting with calcium ion to form a precipitate, e.g. carbonate, phosphate and/or silicate, is added to the boiler water in conjunction with a rate controlling agent such as nitrilotriacetic acid, oxalic acid, hydrosulfuric acid, meta and para toluic acid, citric acid and ethylenediamine tetraacetic acid and an adsorbent, preferably desulfonated lignosulfonates but including other natural and synthetic polymeric materials. A reading of the patent clearly indicates that a wide variety of additives and materials can be used at varying dosages to achieve the objectives of the invention.

GENERAL DESCRIPTION OF THE INVENTION

The present inventors discovered quite unexpectedly that if certain materials were used at critical dosage rates, results could be obtained in boiler water treatment that were not only quite impressive but offered economies which are attractive for the large boiler operations.

According to the discovery, scale which would otherwise be formed from water-soluble calcium, magnesium and iron impurities contained in boiler water which would provide calcium, magnesium and iron ions could be controlled if the following treatment was added to the boiler water or boiler feed water:

(i) a chelant selected from the group of ethylene diamine tetraacetic acid and the water soluble salts thereof, in an amount which is substoichiometric to that amount required to react with said calcium ions present in the water;

(ii) a water soluble phosphate salt which will provide phosphate ions in said water in an amount which is less than a 1:1 mole ratio of phosphate to calcium, but which is sufficient to react with all the calcium ions provided by said impurities that are not complexed by the chelant; and (iii) a water soluble polymethacrylic acid or water soluble salt thereof in an amount sufficient to disperse any particles formed by the reaction of the calcium ions with the phosphate ions and any other particulate matter formed by the reactions of the magnesium and iron ions.

The treatment is particularly effective where the calcium and magnesium impurities in the boiler water are calcium and magnesium carbonates and silicates and where the water soluble phosphate is any inorganic phosphate which yields orthophosphate ions in boiler water such as disodium phosphate, sodium hexametaphosphate, trisodium phosphate, etc.; the chelant is tetrasodium ethylenediamine tetraacetate; and these additives are used in the following dosages: (i) from about 0.4 to 1.4 parts per million of disodium phosphate is added for each part per million of calcium (expressed as calcium carbonate) contained in said water, (ii) from about 0.1 to 0.9 parts per million of chelant (expressed as calcium carbonate) is added for each part of calcium plus magnesium (expressed as calcium carbonate) contained in said water, and (iii) from about 10 to 40 parts per million parts of boiler water of the polymethacrylic acid or water soluble salt is added.

Preferably, the polymethacrylic acid or water soluble salt thereof is added separately from the chelant and phosphate.

Quite unexpected efficacy is achieved when about 0.67 to 1 part per million of disodium phosphate for each part per million of calcium (expressed as calcium carbonate), corresponding to a mole ratio of 0.47 to 0.70, is used together with about 0.5 parts per million of chelant for each part per million of calcium plus magnesium (all expressed as calcium carbonate) and about 20 parts per million parts of boiler water of polymethacrylic acid or water soluble salt are added to the boiler water.

While the present invention appears to possess some similarity with that of U.S. Pat. No. 3,520,813 there are distinct differences which are obtainable through the use of certain prescribed materials in conjunction with the discovery of the use of these materials at dosages which were not contemplated or suggested by the subject patent.

The patent does not in fact suggest the use or the desirability of using polymethacrylic acid polymers. While certain synthetics are suggested, the use of natural polymers such as desulfonated lignins are preferred.

Even more significantly, not only from an efficacy standpoint but from an economical basis, it was established that if less than a 1:1 mole ratio of phosphate to calcium [and certainly no excess as taught by the patent] was used, superior results could be achieved. The use of the minimum amount of phosphate not only provides a better control on the amount of precipitate formed, but also the form, and thus the control and handleability thereof. These as well as other advantages will be apparent from the more specific information presented hereinafter.

RESEARCH BOILER STUDY

A water system for research boiler runs was established which was similar in nature to those commonly found under field conditions although all contaminant concentrations were increased in order to accelerate the tests. The feedwater contained 4 ppm calcium (as $CaCO_3$), 2 ppm magnesium (as $CaCO_3$) and 0.5 ppm iron (as Fe), plus additional sodium sulfate. Ethylene diamine tetraacetic acid (EDTA) was held constant for all runs, except for non-treated "control" runs, and was at one-half the stoichiometry of total calcium plus magnesium hardness. This corresponded to 30 ppm as 38% $Na_4$ EDTA (or 11.4 ppm as $Na_4$ EDTA, or 3 ppm as $CaCO_3$). Three levels of phosphate were examined: 4 ppm as disodium phosphate (DSP) (i.e., the 1:1 DSP/$CaCO_3$ weight ratio level prescribed for the present inventive program, hereinafter referred to as the "CPS" program, equivalent to 2.68 ppm as $PO_4$), two-thirds of the original prescribed level (2.67 ppm as DSP or 1.79 ppm as $PO_4$), and a phosphate to hardness ratio representative of similar research boiler runs for polymer/phosphate precipitation programs (3.67 ppm as $PO_4$). The latter value is also close to the ratio preferred in the program as represented by U.S. Pat. No. 3,520,813. When cycled 30 times, the boiler water had a theoretical total hardness of 180. The observed blow-down pH was 10.8 to 11.2, conductivity was about 2000 micromho.cm$^{-}$, and the average P-alkalinity was 206 ppm as $CaCO_3$.

Two resistance heaters giving 185,000 BTU/ft$^2$/hr were used giving about 9.5 lb/hr steam, and all runs were conducted at 180 psig. Deposit weights were obtained by removing the deposits from the heat transfer surfaces with acid and determining the concentrations of the ions in the resulting solution.

THEORETICAL CONSIDERATIONS

Both the rates of reaction and the equilibrium formation constants are expected to favor the formation of iron-EDTA and calcium-EDTA complexes in the feedwater. Since the formation constants for metal-EDTA complexes decrease in the order $Fe^{+2} > Ca^{+2} > Mg^{+2}$, the EDTA is expected to complex all available iron (dissolved, freshly precipitated, and organically bound, but not the non-hydrous oxides) plus a portion of the remaining calcium. Virtually all EDTA will be in the metal-complex form. In the feedwater system of this study, there was $3 \times 10^{-5}$ molar $EDTA^{4-}$ (i.e., 3 ppm as $CaCO_3$ or 30 ppm as 38% $Na_4$ EDTA). Since total iron+calcium was $4.9 \times 10^{-5}$ molar, the remaining calcium after EDTA was "satisfied" was $1.9 \times 10^{-5}$ molar (1.9 ppm as $CaCO_3$). This calcium would be precipitated by phosphate.

The precipitate formed with calcium and phosphate was expected to be hydroxyapatite, $Ca_{10}(OH)_2(PO_4)_6$; deposit analyses performed were consistent with this form. In hydroxyapatite, the molar ratio of phosphate to calcium is 6:10 or 0.6. To precipitate $1.9 \times 10^{-5}$ molar calcium as hydroxyapatite would require $1.14 \times 10^{-5}$ molar phosphate (1.08 ppm); excess phosphate would show up as residual. Without chelant, the initial calcium level would be $4 \times 10^{-5}$ molar, requiring $2.4 \times 10^{-5}$ molar phosphate (2.28 ppm) for full precipitation. Thus, the effect of the substoichiometric chelant is to reduce the "available" calcium, and therefore to reduce the phosphate demand and the quantity of hydroxyapatite that is produced. In the system used in this study, positive phosphate residuals would be observed for feedwater phosphate levels greater than 1.08 ppm. This number will be different for different feedwaters. In practice, the observed phosphate residual will be less than theoretical due to slow chelant decomposition (which depends on pressure and residence time), and the formation of small quantities of phosphate precipitates with other metals. Magnesium is expected to precipitate as the silicate in preference to phosphate or hydroxide. Table 1 provides theoretical and observed values from the research boiler study. DSP/$CaCO_3$ ratios below 0.67, although perhaps operable under certain conditions, are *not* recommended due to the likelihood of producing a zero phosphate residual.

TABLE 1

THEORETICAL AND OBSERVED PHOSPHATE RESIDUALS

CONDITIONS (Feedwater):
 4 ppm Ca (as $CaCO_3$)
 2 ppm Mg (as $CaCO_3$)
 0.5 ppm Fe (as Fe)
 30 ppm $Na_4$ EDTA (as 38%)
 30 cycles

| Phosphate Feed (ppm as $PO_4$ in Feedwater) | Phosphate/ Calcium (as DSP/$CaCO_3$) | Phosphate Residual (ppm as $PO_4$ at 30 cycles) Theoretical | Observed (avg) |
|---|---|---|---|
| 3.67 | 1.37 | 78 | 43 |
| 2.68 | 1.00 | 48 | 23 |
| 1.79 | 0.67 | 21 | 15 |
| 1.09 | 0.41 | 0 | n/a |

Results
The results of the research boiler runs are given in Table 2. The runs were designed to evaluate:
1. The effect of polymer level.
2. The effect of phosphate level.
3. Comparison to a Polymer/Phosphate program.
4. Evaluation of a separate polymer feed point.

TABLE 2

Results of Research Boiler Evaluations of CPS Program*

| Program | Phosphate/ Ca (As DSP/ $CaCO_3$) | Polymer (ppm in boiler) | Deposit (g/ft$^2$) Upper | Lower | Average Turbidity |
|---|---|---|---|---|---|
| Control[1] | 1.0 | 0 | 3.38 | 5.72 | 26 |
| Control[1] | 1.0 | 0 | 2.20 | 2.77 | 12 |
| CPS | 1.0 | 40 | 0.41 | 0.15 | 3 |
| CPS | 1.0 | 40 | 0.26 | 0.40 | 5 |
| CPS | 1.0 | 20 | 0.17 | 0.14 | 5 |
| CPS | 1.0 | 10 | 0.78 | 0.96 | 39 |
| CPS[2] | 1.0 | 0 | 2.78 | 3.06 | 8 |
| CPS[2] | 1.0 | 0 | 4.98 | 5.54 | 9 |
| CPS | 0.67 | 40 | 0.17 | 0.08 | 10 |
| CPS | 0.67 | 20 | 0.14 | 0.09 | 6 |
| CPS | 0.67 | 10 | 0.22 | 0.26 | 8 |
| Polymer/$PO_4$[3] | 1.37 | 20 | 0.38 | 0.46 | 145 |
| Polymer/$PO_4$[3] | 1.37 | 10 | 0.27 | 0.41 | 121 |
| CPS-High[4] | 1.37 | 40 | 0.09 | 0.09 | 3 |
| CPS-High[4] | 1.37 | 20 | 0.44 | 0.36 | 7 |
| CPS[5] | 1.0 | 40 | 0.18 | 0.37 | 15 |

TABLE 2-continued

Results of Research Boiler Evaluations of CPS Program*

| Program | Phosphate/Ca (As DSP/CaCO$_3$) | Polymer (ppm in boiler) | Deposit (g/ft$^2$) Upper | Deposit (g/ft$^2$) Lower | Average Turbidity |
|---|---|---|---|---|---|
| CPS[5] | 1.0 | 20 | 0.44 | 0.54 | 15 |

*Conditions: Feedwater with 4 ppm Ca(as CaCO$_3$), 2 ppm Mg (as CaCO$_3$), 0.5 ppm Fe(as Fe), phosphate and polymer as indicated, EDTA equivalent to 3 ppm as CaCO$_3$ unless noted. Boiler operated at 180 psig, 30 cycles, 185,000 BTU/ft$^2$/hr, 44 hours. All ingredients fed from single feedwater tank (except Note 5). Estimated Error 0.3 g/ft$^2$ Notes:
[1] No EDTA, no polymer.
[2] No polymer.
[3] No chelant. Combination Sulfonated Styrene Polymer/PMA polymer/used.
[4] CPS program with phosphate level equivalent to runs for Polymer/Phosphate program.
[5] Polymer fed separately from other ingredients.

DISCUSSION

The effect of polymer was dramatic. At 20-40 ppm active in the boiler, deposit values were extremely low; the deposits were barely visible on the probes. In the absence of polymer (i.e., EDTA and phosphate) the deposit values were indistinguishable from the control (i.e, phosphate only). This does *not* indicate a lack of activity by EDTA; it does show that half-stoichiometric feed of EDTA is ineffective in the absence of polymer. The threshold of effectiveness appeared to be about 10 ppm polymer.

The Polymer/Phosphate program has been shown to be effective in a similar system and it was used for the purpose of comparison. The Polymer/Phosphate program uses phosphate precipitation and no chelant. At equivalent 10 ppm and 20 ppm dosages the CPS (with DSP/CaCO$_3$=0.67) Polymer/Phosphate programs gave equivalent results.

There were notable differences in the blowdown turbidity values among the various programs and the turbidity values give some indication of the size and number density of the blowdown particles. The Polymer/Phosphate runs gave high turbidities which represent the dispersant mechanism of this program. In contrast, the CPS runs gave very low turbidities meaning that there were far fewer particles and/or the particle dimensions were so small that light was not scattered. Since the chelant reduces the total amount of precipitable iron and calcium, there is definitely a reduction in the total mass of the precipitates. Under these conditions a comparatively high ratio of polymer to precipitate would exist, which probably inhibits the growth of nucleated crystals. It is unlikely that the nature of the precipitate is changed after it has formed, other than the blockage of crystal growth. By blocking the growth of the crystals, control of deposition is obtained. The CPS Program produced few and/or smaller particles which indicate its superiority to the polymer/phosphate program.

It is generally preferable to feed the polymer separate from the phosphate/chelant. This is because the boiler water polymer concentration depends on cycles, while the preferred phosphate/chelant concentrations are dependent on the nature of the feedwater. To ensure that there were no unexpected influences of separate feed points, two runs were conducted utilizing a second feed system for the research boiler. In these runs the only agent that was fed through the second feed system was diluted polymer. No significant differences were observed at the 20 and 40 ppm levels as compared to the single feed tank runs (Table 2).

Having thus described the invention, what we claim is:

1. A method for controlling scale which would otherwise be formed from water-soluble calcium, magnesium and iron impurities contained in boiler water which would provide calcium, magnesium and iron ions, which method comprises adding to said water:
    (i) a chelant selected from the group of ethylene diamine tetraacetic acid and the water soluble salts thereof, in an amount which is substoichiometric to that amount required to react with said ions present in the water, and is at least about 0.5 parts per million for each part of calcium and magnesium (all expressed as calcium carbonate) contained in the water;
    (ii) a watr soluble phosphate salt which will provide orthophosphate ions in said water in an amount which is less than a 1:1 mole ratio of phosphate to calcium, but which is sufficient to react with all the calcium ions provided by said impurities that are not complexed by the chelant; and
    (iii) a water soluble polymethacrylic acid or water soluble salt thereof in an amount sufficient to disperse any particles formed by the reaction of the calcium ions with the phosphate ions and any other particulate matter formed by the reactions of the magnesium and iron ions.

2. A method according to claim 1 wherein the calcium and magnesium impurities in said boiler water are calcium and magnesium carbonates and silicates, said water soluble phosphate is selected from the group of disodium phosphate and sodium hexametaphosphate and wherein said chelant is tetrasodium ethylenediamine tetraacetate.

3. A method according to claim 2 wherein the phosphate is disodium phosphate.

4. A method according to claim 3 wherein from about 0.4 to 1.4 parts per million of disodium phosphate is added for each part per million of calcium (expressed as calcium carbonate) contained in said water.

5. A method according to claim 4 wherein from about 10 to 40 parts per million parts of boiler water of polymethacrylic acid or water soluble salt thereof is added to said water.

6. A method according to claim 5 wherein the polymethacrylic acid or water soluble salt thereof is added separately from the chelant and phosphate.

7. A method according to claim 5 wherein about 0.67 parts per million of disodium phosphate is added and about 0.5 parts per million of chelant is added.

8. A method according to claim 7 wherein from about 10 to 40 parts per million parts of boiler water of polymethacrylic acid or water soluble salt thereof is added to said water.

9. A method according to claim 8 wherein the polymethacrylic acid or water soluble salt thereof is added separately from the chelant and phosphate.

* * * * *